(12) United States Patent
Russo et al.

(10) Patent No.: US 8,837,278 B2
(45) Date of Patent: Sep. 16, 2014

(54) CONCURRENTLY APPLYING AN IMAGE FILE WHILE IT IS BEING DOWNLOADED USING A MULTICAST PROTOCOL

(75) Inventors: Richard T. Russo, Redmond, WA (US); Aaron Matthew Tyler, Redmond, WA (US); Blaine Young, Redmond, WA (US); Bruce Green, Seattle, WA (US); Alaa H. Abdelhalim, Bellevue, WA (US); Roger D. Seielstad, Redmond, WA (US); Peter A. Gurevich, Woodinville, WA (US); Vittal Pai, Redmond, WA (US); Andrew Sveikauskas, Seattle, WA (US); P. Daniel Suberviola, II, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 200 days.

(21) Appl. No.: 12/950,259

(22) Filed: Nov. 19, 2010

(65) Prior Publication Data

US 2012/0131087 A1 May 24, 2012

(51) Int. Cl.
*G08C 15/00* (2006.01)
*G06F 3/00* (2006.01)
*G06F 15/16* (2006.01)
*G06F 9/445* (2006.01)
*G06F 5/14* (2006.01)
*G06F 15/173* (2006.01)

(52) U.S. Cl.
CPC ...... *G06F 5/14* (2013.01); *G06F 9/445* (2013.01); *G06F 15/173* (2013.01); *G06F 15/16* (2013.01)
USPC ............ 370/229; 370/252; 370/394; 710/56; 709/203; 709/224; 709/228; 709/230

(58) Field of Classification Search
USPC ........ 370/229, 252, 394; 707/999.001, 999.1; 710/56; 709/203, 224, 228, 230
See application file for complete search history.

(56) References Cited

U.S. PATENT DOCUMENTS 5,586,264 A * 12/1996 Belknap et al. ............... 725/115
6,421,777 B1    7/2002 Pierre-Louis
6,963,981 B1 * 11/2005 Bailey et al. ................... 726/22
7,716,636 B2    5/2010 Goncharenko (Continued)

OTHER PUBLICATIONS

In re Nuijten, 2006-1371, 09/211,928.*
Image-Based Installation for Microsoft Windows Server 2008—Published Date: May 2008; http://www.dell.com/downloads/global/power/ps2q08-20070572-Zhang.pdf.

(Continued)

*Primary Examiner* — Alpus H Hsu
*Assistant Examiner* — Walter Divito
(74) *Attorney, Agent, or Firm* — John Jardine; Andrew Sanders; Micky Minhas

(57) ABSTRACT

A system and a process for deploying a computer file involves a client computer applying the computer file concurrently with downloading the computer file from a file server. The concurrent operations can be performed even when the data of the computer file is downloaded out of order. The computer file includes a plurality of file segments. The client computer obtains information defining the file segments and monitors the received data of the computer file during downloading. When downloading of a file segment is complete, the client computer applies the completed segment concurrently with receiving other segments of the computer file from the file server. The process can be used when the computer file is downloaded using a multicast protocol, but is not limited to use with multicast protocols. The client computer can request only needed segments of the computer file.

20 Claims, 6 Drawing Sheets

(56) References Cited

U.S. PATENT DOCUMENTS

| | | | |
|---|---|---|---|
| 7,716,666 B2 | 5/2010 | Goncharenko | |
| 2006/0156271 A1* | 7/2006 | Goncharenko et al. | 717/100 |
| 2009/0003342 A1* | 1/2009 | Dickens et al. | 370/390 |
| 2009/0006641 A1* | 1/2009 | Yaqoob et al. | 709/231 |
| 2009/0006642 A1* | 1/2009 | Dickens et al. | 709/231 |
| 2009/0013079 A1 | 1/2009 | Dickens et al. | |
| 2009/0248886 A1* | 10/2009 | Tan et al. | 709/231 |
| 2010/0011203 A1 | 1/2010 | Dickens et al. | |
| 2010/0180042 A1 | 7/2010 | Gemmell et al. | |
| 2010/0211943 A1* | 8/2010 | Chu et al. | 717/174 |
| 2011/0314107 A1* | 12/2011 | Garcia | 709/206 |

OTHER PUBLICATIONS

CA IT Client Manager Microsoft Windows 7 Deployment Methodology—Published Date: 2010; http://www.ca.com/files/TechnologyBriefs/client_manager_windows7_4901_229118.pdf.

Single Instance Storage in Windows® 2000—Published Date: 2000; http://www.usenix.org/events/usenix-win2000/full_papers/bolosky/bolosky_html/.

Imaging and Desktop Engineering—Published Date: 2006; http://technet.microsoft.com/en-us/library/cc507871.aspx.

Deploying Vista—Published Date: May 14, 2009; http://www.windowsnetworking.com/articles_tutorials/Deploying-Vista-Part13.html.

* cited by examiner

CONCURRENTLY APPLYING AN IMAGE FILE WHILE IT IS BEING DOWNLOADED USING A MULTICAST PROTOCOL

BACKGROUND

Downloading of a computer file from a file server to one or more client computers is known. The computer file may include executable software. In one specific example, the computer file may be a Windows® image file and supplies a Windows operating system to the client computers. The downloading process may employ a multicast protocol in which the computer file can be downloaded to several client computers concurrently. The computer file may be compressed and may include data, in addition to the executable software, that is needed by the client computer to utilize the computer file.

In the conventional downloading process, the entire computer file is downloaded to the client computer. Depending on the size of the file and the capabilities of the client computer, the file may be stored in memory or may be written to disk. After the image file is completely downloaded to the client computer, an "apply" process is performed on the computer file. The apply process involves decompressing the received file, performing any other necessary processing and writing the processed file to disk. The downloaded file is then ready for execution. Downloading of an operating system image file and performing an apply process on the downloaded image file may be referred to as "deployment" of the operating system.

It is apparent that the time for the conventional deployment process is the download time plus the apply time. This time can be substantial in the case of large files. Further, the conventional deployment process requires storage space for a full copy of the downloaded image file and for a copy of the decompressed file after completion of the apply process. In the case of large files, the storage requirements may be problematic.

SUMMARY

The present invention is directed to a system and a process for deploying a computer file which involves a client computer applying the computer file concurrently with downloading the computer file from a file server. The concurrent operations can be performed even when the data of the computer file is downloaded out of order. The computer file includes a plurality of file segments. The client computer obtains information defining the file segments and monitors the received data of the computer file during downloading. When downloading of a file segment is complete, the client computer applies the completed segment concurrently with receiving other segments of the computer file from the file server. The invention results in a reduction in the time to deploy an image file and a reduction in the storage space required to support deployment of an image file. The invention can be used when the computer file is downloaded using a multicast protocol, but the invention is not limited to use with multicast protocols. The client computer can request only needed segments of the computer file.

According to a first aspect of the invention, a method is provided for deploying a computer file having a plurality of file segments. The method comprises receiving, by a client computer from a server computer, information defining the segments of the computer file; establishing, by the client computer, a transmission session with the server computer for downloading the computer file; receiving, by the client computer, data of the computer file transmitted by the server computer; monitoring, during reception of the computer file and based on the information defining the segments of the computer file, the received data of the computer file to determine when a complete file segment has been received; and when the client computer determines that a complete file segment has been received, the client computer applying the complete file segment of the computer file concurrently with receiving other segments of the computer file from the server computer.

According to a second aspect of the invention, a client computer configured to deploy a computer file having a plurality of file segments is provided. The client computer comprises a processor and a memory device, the memory device containing modules for execution by the processor, the modules including: a multicast module to establish a multicast session with a server computer for downloading a computer file and to receive data of the computer file transmitted by the server computer; and an image apply module to receive from the server computer information defining the segments of the computer file, to monitor, during reception of the computer file and based on the information defining the segments of the computer file, the received data of the computer file to determine that a complete file segment has been received and, when a complete file segment has been received, to apply the complete file segment of the computer file concurrently with receiving other segments of the computer file from the server computer.

According to a third aspect of the invention, a further method for deploying a computer file having a plurality of file segments comprises receiving, by a client computer from a server computer, information defining the segments of the computer file; determining, by the client computer, a block range of one or more segments of the computer file based on the information defining the segments of the computer file; establishing, by the client computer, a transmission session with the server computer for downloading the computer file; receiving, by the client computer, data of the computer file transmitted by the server computer in the form of data blocks having block numbers; monitoring, during reception of the computer file, the block numbers of the received data blocks; determining from the block range of the one or more segments and the block numbers of the received data blocks when a complete file segment has been received; and when the client computer determines that a complete file segment has been received, the client computer applying the complete file segment of the computer file concurrently with receiving other segments of the computer file from the server computer.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
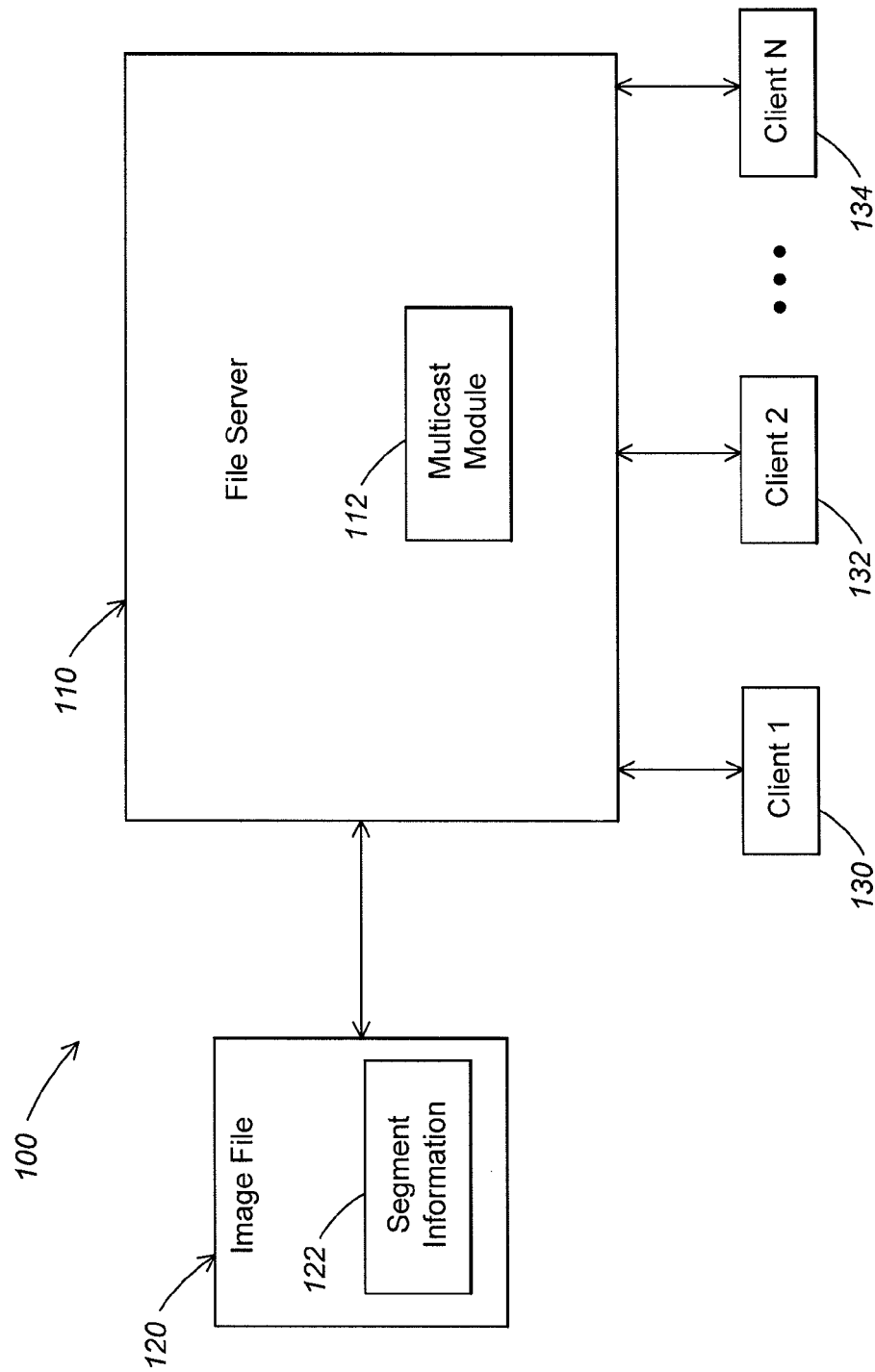
FIG. 1 is a schematic block diagram of a multicast system, illustrating components involved in deploying an image file in accordance with embodiments of the invention.

A schematic block diagram of relevant components of a multicast system 100 suitable for implementation of the present invention is shown in FIG. 1. The multicast system 100 includes a file server 110 and one or more client computers 130, 132, . . . 134. The file server 110 includes a multicast module 112 configured to execute a multicast protocol for multicast transmissions. The file server 110 including multicast module 112 may be embodied in a standard computer server device, a desktop computer, a notebook or portable computer, a tablet computer, a mainframe computer or any other device with the ability to broadcast stored data to a plurality of devices connected to a network. An image file 120 or other computer file may be accessed by file server 110. The image file 120 may be in a separate storage device or in a storage device that is part of file server 110. Image file 120 includes segment information 122 as described below. The storage device may contain one or more image files for selection by a client computer.

File server 110 may be connected via a network connection to one or more client computers, such as client computers 130, 132, . . . 134 shown in FIG. 1. The file server 110 may be configured to download the image file 120 to one or more of the client computers 130, 132, . . . 134 upon request using a multicast protocol.

Figure 2:
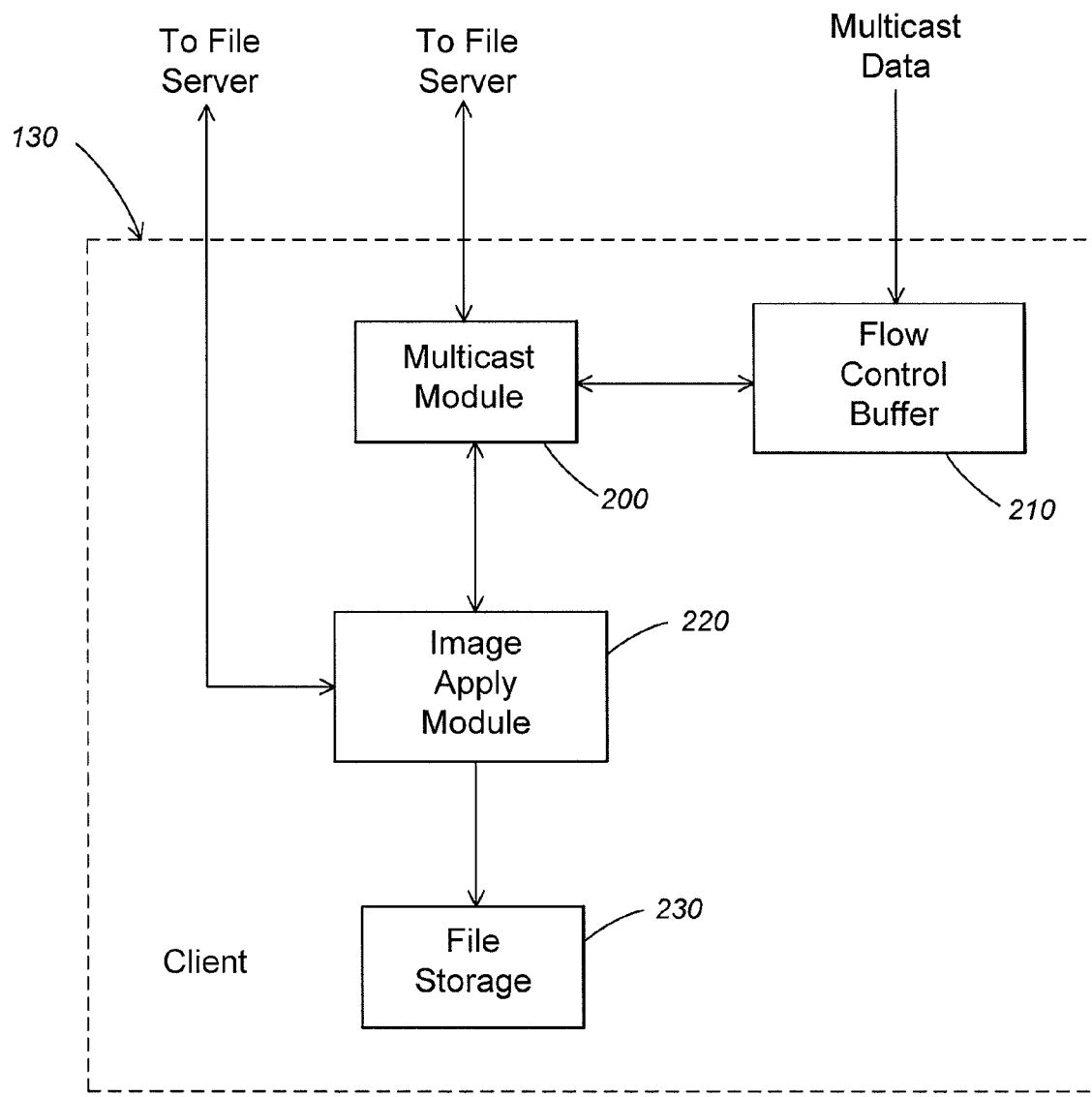
FIG. 2 is a schematic block diagram of a client computer, illustrating components involved in deploying an image file in accordance with embodiments of the invention.

A schematic block diagram of relevant components of client computer 130 is shown in FIG. 2. Other client computers in the multicast system 100 may have the same configuration. Client computer 130 may include a multicast module 200 that operates in conjunction with multicast module 112 of file server 110 to receive multicast data transmitted by file server 110. The multicast data may be written to a flow control buffer 210. All or part of the downloaded image file 120 may be held in flow control buffer 210. An image apply module 220 monitors the received data for one or more segments of the image file held in flow control buffer 210 and performs the apply process on file segments that have completed downloading. After performing the apply process, the image file is written to file storage 230, typically a disk unit in client computer 130. In addition, image apply module 220 communicates with file server 110 to obtain segment information 122 related to image file 120 as described below. In some file transfer protocols, the buffering mechanism provided by flow control buffer 210 may be omitted.

The image file 120 may include a plurality of segments which are logical elements of the complete image file. A segment is a part of the image file 120 that can be applied independently of other segments. The segments can have any length and may have different lengths. The multicast protocol uses data blocks of fixed size. A segment may be transmitted as one or more blocks or as part of a block. Conversely, a block may include part of a segment, an entire segment, or all or parts of two or more segments. The segments of the image file 120 may be specified by the segment information 122. In particular, the segment information 122 may specify segment offsets of each segment in the image file 120. The offsets of the start and end points of each segment in the image file may be specified by segment information 122. In terms of the complete image file being downloaded, the offset of the first byte contained in the block of block number N is N*B, where B is the fixed block size for the multicast transmission. The segment information 122 may also specify the block size of the multicast transmission.

In the following discussion, the offsets are byte indexes, 0-based, relative to the start of the file. A segment is a half-open interval consisting of two byte offsets. A block number is a 0-based index of the block relative to the start of the file. The block size is given in bytes. A segment defined by a half-open interval of offsets [O1, O2) is completely contained by the smallest possible closed interval of block ranges [floor (O1/N), floor (O2−1/N)]. Segments are of non zero length (i.e., O2 is greater than O1) and do not overlap. Block ranges are closed intervals and therefore always contain at least one block (for block range [B1, B2], B2 is greater than or equal to B1). It is possible to have multiple segments in the same block.

Figure 3:
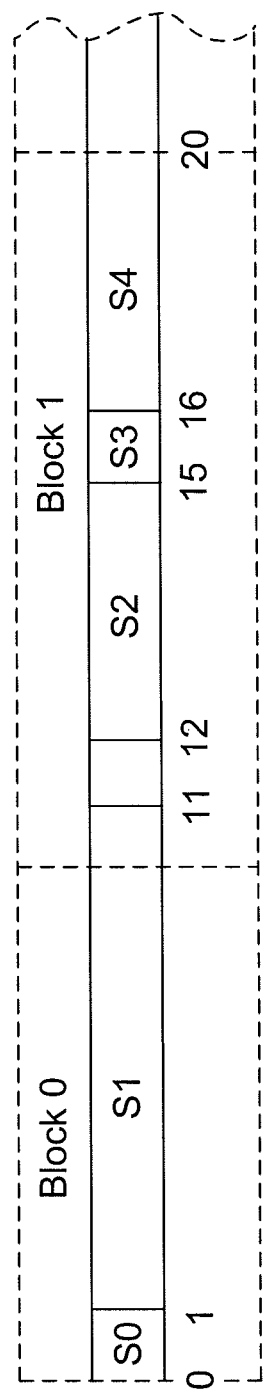
FIG. 3 is a schematic diagram that illustrates a portion of an image file.

An example of a portion of image file 120 is illustrated in the schematic diagram of FIG. 3. The relationship between segments of the image file and data blocks used in multicast transmission of the image file from the file server 110 to client computer 130 is shown in FIG. 3. In the example of FIG. 3, the block size B=10. The illustrated portion of the image file 120 includes segment S0[0, 1), segment S1[1, 11), segment S2[12, 15), segment S3[15, 16) and segment S4[16, 20). These half-open interval segments correspond to closed interval block ranges [0, 0], [0, 1], [1, 1], [1, 1], and [1, 1], respectively. The processing of image file 120 as data blocks are received by client computer 130 is described below.

Referring again to FIG. 3, a portion [11, 12] of block 1 does not contain segment data. This illustrates a feature in which certain data in the image file may not be relevant and is not transferred as part of the image file in the multicast session. The obtaining of segment information permits the image data to be applied as complete segments are received and has the secondary benefit that unnecessary data blocks in the file can be determined. This is communicated to the file server and the unnecessary blocks are not sent in the multicast session. In general some data blocks in the file may not be covered by any segment.

The image file may contain multiple images, and the client may be interested in only a single image. Thus the image file may contain many segments that are not of interest to the client. The data may be sent using a client-pull model in which the server periodically queries the clients for the blocks they need, and only transmits the blocks requested by at least one client. This approach may reduce the time for downloading the image file, since unneeded segments are not transmitted.

Figure 4A:
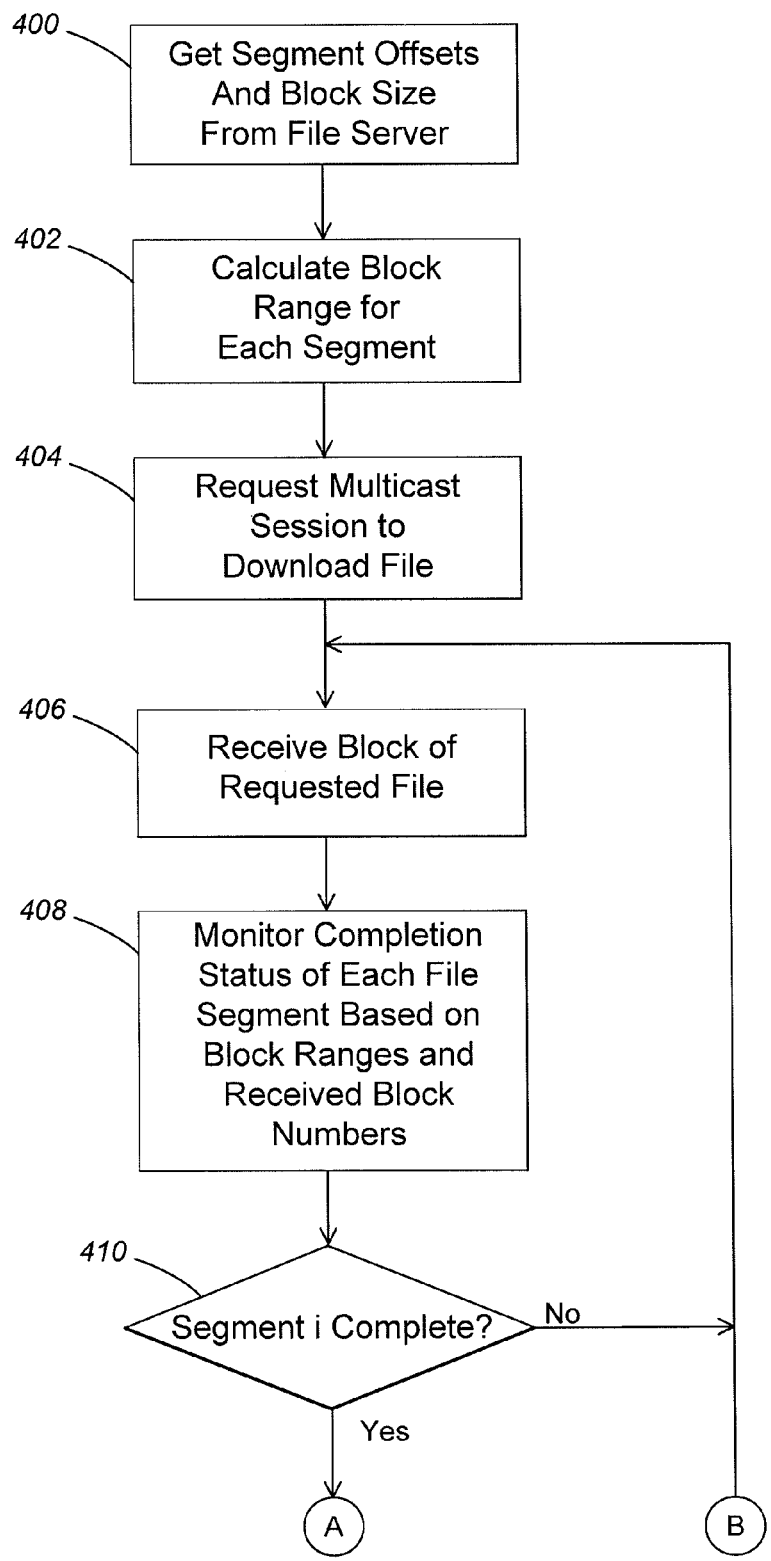
FIGS. 4A and 4B illustrate a flow diagram of a process for deploying an image file in accordance with embodiments of the invention.
Figure 4B:
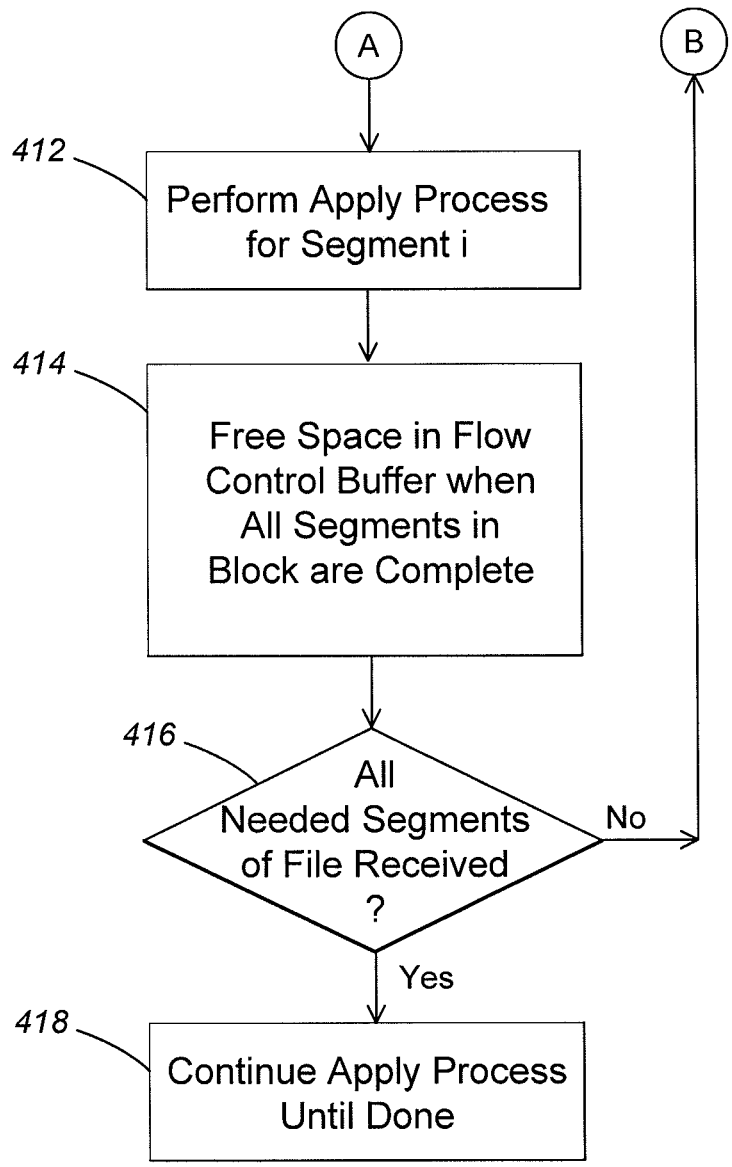

A flow chart of a process performed by client computer 130 for deploying an image file, such as a Windows image file, is shown in FIGS. 4A and 4B. It will be understood that the process of FIGS. 4A and 4B is shown by way of example and may include additional acts and/or different acts.

In act 400, client computer 130 requests from file server 110 segment information 122 for a specified image file. The segment information 122 may be requested using a conventional non-multicast protocol and may include segment start and end offsets and block size. The requested information is retrieved by file server 110 from the specified image file 120 and sent to the client computer 130.

In act 402, the client computer 130 calculates a block range for each segment in the image file to be downloaded. A block index for the start and end points of each segment can be computed as the segment offset divided by the block size. By knowing the block index of the start and end points of each segment, the reception of each file segment can be monitored.

In act 404, the client computer 130 requests a multicast session to download the specified image file. In some embodiments, the multicast protocol may be an on-demand multicast protocol as described in U.S. Patent Publication No. US 2009/0003342, published Jan. 1, 2009, which is hereby incorporated by reference. An on-demand multicast session is created when the first client requests the image file, and the session is ended when the last client finishes downloading the image file and exits the session. Clients are allowed to join or leave a transmission session at any point in the transmission. From creation of the session until it is ended, the session is continuously available, although data is not necessarily continuously transmitted. Data blocks missed by late joining clients are retransmitted through amalgamated client requests and multiple transmission cycles until all clients that have joined the transmission session receive all content. When a client has received all data blocks of the file, the client may exit the ongoing session. The on-demand multicast protocol provides quasi-random and out-of-order access to the image file. In other embodiments, the multicast transmission may be scheduled at a particular time or may be manual where an administrator manually issues a start command at the file server 110.

In act 406, the client computer 130 receives blocks of the requested image file. In some cases, such as the on-demand multicast protocol, the multicast protocol may result in the client computer 130 receiving blocks of the image file out of order. Blocks are transmitted using the multicast protocol in a packet format that contains a block number and a block payload. The received blocks of the image file are written into flow control buffer 210 (FIG. 2), and the block numbers are supplied to image apply module 220.

In act 408, the image apply module 220 monitors reception of at least one file segment and preferably each file segment by monitoring received block numbers. In particular, for each received block, the corresponding segment or segments are determined. By monitoring the received block numbers, the completion of segments can be determined. Referring again to FIG. 3, when block 0 is received, it may be observed that segment S0 is complete, whereas block 0 and 1 are required for completion of segment S1. As indicated above, a segment may occupy all or part of a data block. Further, a segment may occupy multiple data blocks.

In some embodiments, the image apply module 220 may determine when each file segment of the image file has been completely received. In other embodiments, the image apply module 220 may determine when only larger file segments of the computer file have been completely received. For example, file segments larger than a threshold size may be monitored.

In act 410, it is determined whether the reception of segment i is complete, where i is an index of segments in image file 120. In the example of FIG. 3, segment S0 is complete when block 0 is received. However, segment S1 is complete when both block 0 and block 1 have been received. If it is determined in act 410 that segment i is not complete, the process returns to act 406 to receive additional blocks of the requested image file. If it is determined in act 410 that segment i is complete, the process proceeds to act 412. It will be understood that the monitoring of each segment of the image file proceeds in parallel since the segments may be received out of order and may be completed out of order.

In act 412, the apply process is performed for segment i of the image file which, as determined in act 410, has been fully received. The apply process for segment involves decompression of compressed data and other functions required to convert the received segment to an executable portion of the operating system. The apply function is known generally in the art. The apply process described herein differs from the conventional apply process due to the fact that the apply process is performed on complete segments as they are received rather than after reception of the complete image file and due to the fact that the apply process may be performed on segments out of order. The data resulting from the apply process is written to file storage 230.

In act 414, space in the flow control buffer 210 is made available when all segments in a particular block are complete and the apply process has been performed on the segments in the block. Freeing space in the flow control buffer 210 reduces the risk that the flow control buffer will become full, thereby necessitating a halt in the downloading and/or writing a portion of the image file to disk prior to the apply process. In the example of FIG. 3, when block 0 is received, segment S0 is complete but segment S1 remains incomplete until block 1 is received. Therefore, block 0 remains in flow control buffer 210 until block 1 is received. When blocks 0 and 1 have been received, segments S0, S1, S2, S3 and S4 are complete and blocks 0 and 1 are no longer required in flow control buffer 210. It will be understood that act 414 is optional depending on the size of flow control buffer 210, the size of the image file to be downloaded and whether writing a portion of the file to disk is acceptable.

In act 416, it is determined whether all needed segments of the image file have been received. If all needed segments of the image file have not been received, the process returns to act 406 and additional blocks of the image file are received. If all needed segments of the image file have been received, the process proceeds to act 418. In act 418, the apply process is continued until all needed segments have been processed.

Figure 5:
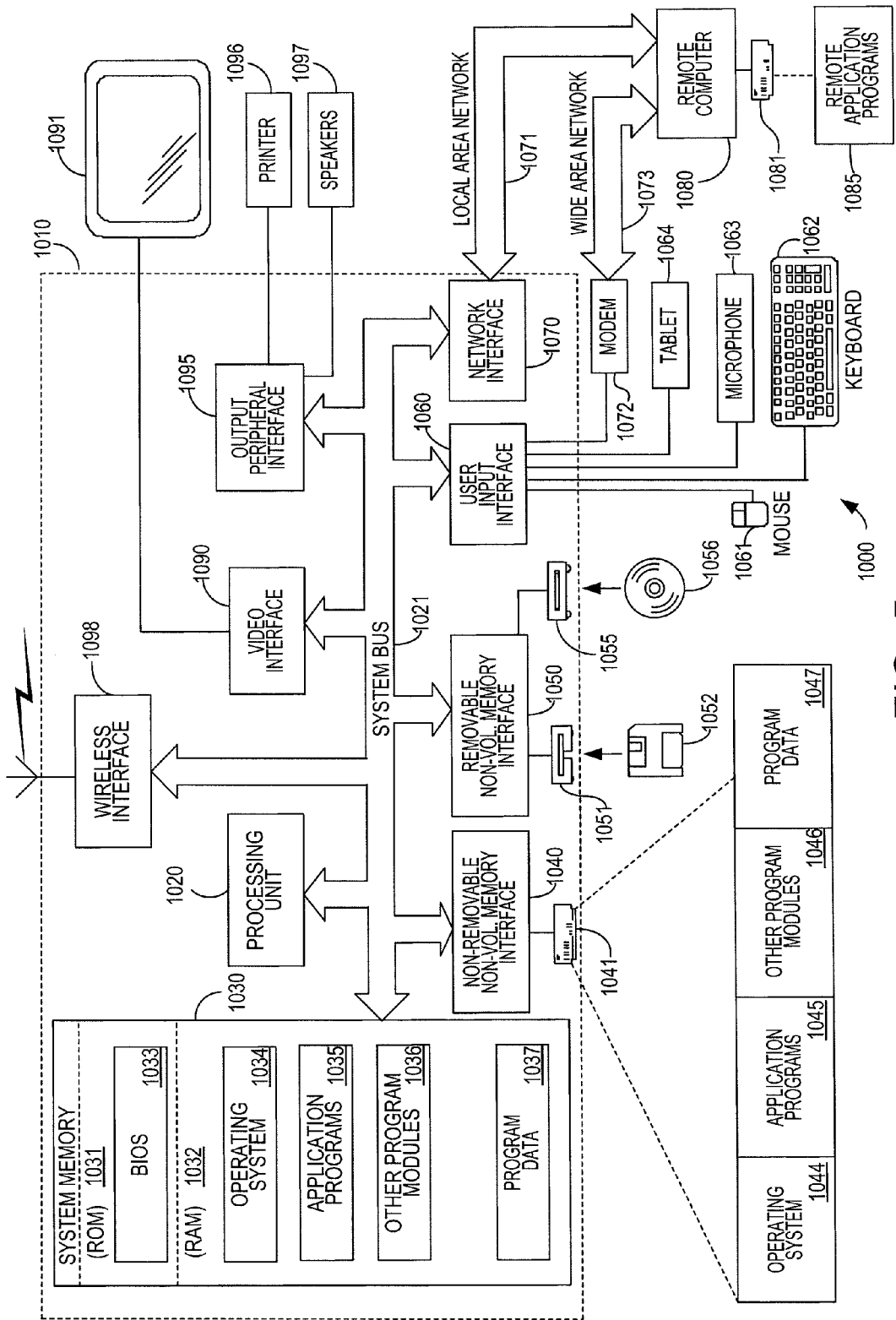
FIG. 5 is a schematic block diagram of a computing device that may be implemented as a file server or as a client computer.

FIG. 5 illustrates an example of a suitable computing system environment 1000 on which the invention may be implemented. The computing system environment 1000 is only one example of a suitable computing environment and is not intended to suggest any limitation as to the scope of use or functionality of the invention. Neither should be computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 5, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system 1021, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Combinations of the any of the above should also be included within the scope of computer readable storage media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 5 illustrates operating system 1034, application programs 1035, other program modules 1036, and program data 1037.

The computer 1010 may also include other removable/non-removable volatile/nonvolatile computer storage media. By way of example only, FIG. 5 illustrates a hard disk drive 1040 that reads from or write to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, discussed above and illustrated in FIG. 5, provide storage of computer readable instructions, data structures, program modules and other data for the computer 1010. In FIG. 5, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices may include a microphone 1063, joystick, a tablet 1064, satellite dish, scanner, or the like. These and other input devices are often connected to the processing unit 1020 through a user input interface 1060 that is coupled to the system bus, but may not be connected by other interface and bus structures, such as a parallel port, game port or a universal serial bus (USB). A monitor 1091 or other type of display device is also connected to the system 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 5. The logical connections depicted in FIG. 5 include a local area network (LAN) 1071 and a wide area network (WAN) 1073 and a wireless link, for example via a wireless interface 1098 complete with an antenna, but may also include other networks. Such networking environments are commonplace in offices, enterprise-wide computer networks, intranets and the Internet. While wireless interface 1098 is shown directly connected to system bus 1021, it is recognized that the wireless interface 1098 may be connected to system bus 1021 via network interface 1070.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 5 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for deploying a computer file that is segmented into a plurality of file segments to a computing device, comprising:
- receiving, from a server computer, information defining a start offset for a particular file segment of the plurality of file segments, an end offset for the particular file segment, and a block size for at least some blocks of the computer file;
- calculating, based on the received start offset, end offset, and block size, a block range for the particular file segment, wherein the calculated block range defines the blocks that each include at least a portion of the particular file segment;
- beginning reception, into a buffer, of at least a portion of the computer file from the server computer;
- monitoring, based on the calculated block range, reception of the particular file segment;
- determining, based on the monitoring of the reception status, that reception of the particular file segment has completed;
- in response to the determination that the reception of the particular file segment has completed, applying, by the computing device, the received particular file segment while concurrently continuing reception of at least the portion of the computer file from the server computer;
- determining that all file segments that are at least partially included in a particular data block have been applied; and
- in response to the determination that all file segments that are at least partially included in the particular data block have been applied, making space, from the buffer, that is associated with the particular data block available.

2. The method of claim 1, wherein the method further comprises:
- establishing a transmission session with the server computer, wherein the transmission session is in accordance with a protocol that provides quasi-random and out of order access to the computer file, and wherein the particular file segment is received via the transmission session.

3. The method of claim 1, wherein the method further comprises:
- transmitting a request for the particular file segment of the computer file to the server computer.

4. The method of claim 1, wherein the computer file comprises a compressed operating system image file containing one or more operating system images.

5. The method of claim 1, wherein the monitoring comprises concurrently monitoring reception of two or more file segments of the computer file.

6. The method of claim 1, wherein at least the portion of the computer file is received in data blocks, and wherein the information defining at least some of the plurality of file segments associates the particular file segment with a set of data blocks.

7. The method of claim 6, wherein the particular file segment is associated with multiple blocks, and wherein multiple file segments are associated with at least one of the multiple blocks.

8. The method of claim 1, wherein the information includes offsets of the start and end points of each file segment of the plurality of file segments.

9. The method of claim 1, wherein:
- monitoring the reception of the particular file segment comprises monitoring the reception based on reception of blocks in the calculated block range; and
- determining that reception of the particular file segment has completed comprises determining that all blocks in the calculated block range have been received.

10. The method of claim 9, wherein monitoring the reception of the particular file segment further comprises monitoring out-of-order reception of blocks in the calculated block range.

11. A computer-readable storage device having computer-executable instructions stored therein that, when executed by the computing device, perform the method of claim 1.

12. A client computer configured to deploy a computer file having at least a plurality of file segments, comprising:
- a processor and a memory device, the memory device containing modules for execution by the processor, the modules including:
  - a multicast module to receive at least a portion of the computer file transmitted by a server computer via a multicast protocol;
  - a flow control buffer to buffer portions of the computer file received from the server computer; and
  - an image apply module to:
    - receive from the server computer information defining a particular file segment of the plurality of file segments of the computer file, wherein the information for the particular file segment includes a start offset for the particular file segment, an end offset for the particular file segment, and a data block size for at least some blocks of the computer file;
    - calculate, based on the start offset, end offset, and data block size, a block range for the particular file segment, wherein the calculated block range defines the blocks that each include at least a portion of the particular file segment;
    - determine, based on the calculated block range, that the particular file segment has been completely received;
    - in response to the determination that the particular file segment has been completely received, apply the particular file segment of the computer file while the client computer is receiving other file segments of the computer file from the server computer;
    - determine that all file segments that are at least partially included in a particular data block have been applied; and
    - in response to the determination that all file segments that are at least partially included in the particular data block have been applied, make at least a portion of space associated with the particular data block available in the flow control buffer.

13. The client computer of claim 12, wherein:
the image apply module is also to concurrently monitor reception of two or more file segments of the computer file.

14. The client computer of claim 12, wherein at least the portion of the computer file is received in data blocks, and wherein the information defining the particular file segment associates the particular file segment to a set of data blocks.

15. The client computer of claim 14, wherein the start offset identifies a first data block containing data of the particular file segment and the end offset identifies a last data block containing data of the particular file segment.

16. The client computer of claim 14, wherein the image apply module is also to:
- monitor reception of the particular file segment based on reception of data blocks in the calculated block range; and determine that the particular file segment has been completely received based on a determination that all data blocks in the calculated block range have been received.

17. The client computer of claim 12, wherein the particular file segment is associated with multiple data blocks, and wherein multiple file segments are associated with at least one of the multiple data blocks associated with the particular file segment.

18. A method for deploying a computer file having a plurality of file segments, comprising:
   receiving, from a server computer, information defining at least some of the plurality of file segments of the computer file, the received information including at least:
      a start offset for each of the at least some of the plurality of file segments;
      an end offset for each of the at least some of the plurality of file segments; and
      a block size for data blocks containing the at least some of the plurality of file segments;
   determining a block range of one or more file segments of the at least some of the plurality of file segments based on the information defining at least some of the plurality of file segments of the computer file;
   receiving data of the computer file transmitted by the server computer in data blocks having block numbers into a buffer;
   monitoring, during reception of the computer file, the block numbers of the received data blocks;
   determining from the determined block range of the one or more file segments and the block numbers of the received data blocks that a complete file segment has been received;
   in response to the determination that the complete file segment has been received, applying the complete file segment of the computer file concurrently with receiving other segments of the computer file from the server computer;
   determining that all file segments that are at least partially included in a particular data block have been applied; and
   in response to the determination that all file segments that are at least partially included in the particular data block have been applied, freeing space in the buffer that is associated with the particular data block.

19. The method of claim 18, wherein determining that the complete file segment has been received includes determining from the block numbers that all blocks in the block range of the complete file segment have been received.

20. The method of claim 18, wherein applying the complete file segment includes decompressing the file segment and writing the decompressed file segment to a storage device.

* * * * *